Oct. 5, 1965

C. D. GABRIEL 3,210,559

SHIFT REGISTER WITH INTERSTAGE MONOSTABLE PULSE-FORMING AND GATING MEANS

Filed Nov. 6, 1959

2 Sheets-Sheet 1

INVENTOR.
CLAUDE D. GABRIEL

BY Francis A. Varallo
AGENT

Oct. 5, 1965 C. D. GABRIEL 3,210,559
SHIFT REGISTER WITH INTERSTAGE MONOSTABLE PULSE-FORMING AND GATING MEANS
Filed Nov. 6, 1959 2 Sheets-Sheet 2
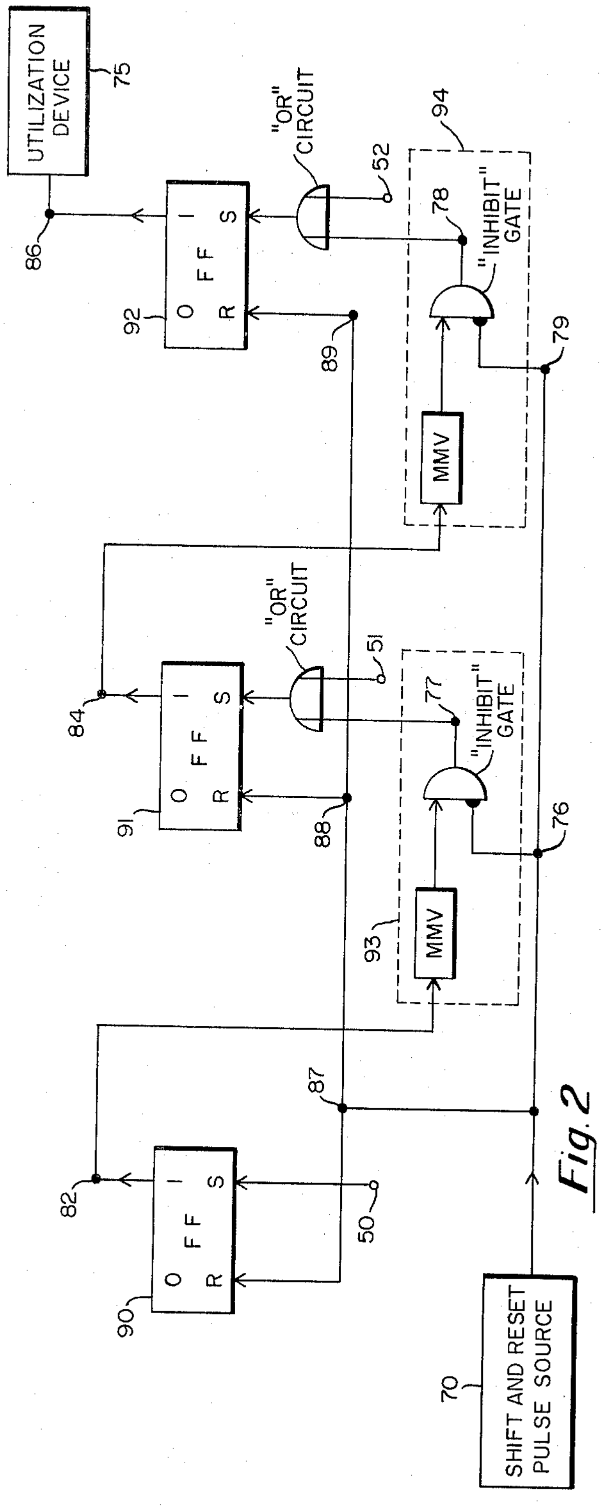
Fig. 2
| CYCLE | FF 90 | FF 91 | FF 92 |
| --- | --- | --- | --- |
| CLEAR | 0 | 0 | 0 |
| PRESET | 1 | 1 | 0 |
| FIRST TRANSFER | 0 | 1 | 1 |
| SECOND TRANSFER | 0 | 0 | 1 |
| THIRD TRANSFER | 0 | 0 | 0 |
Fig. 3
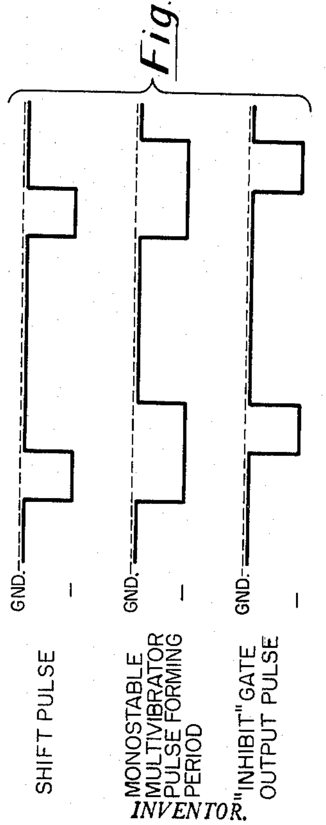
Fig. 4
INVENTOR.
CLAUDE D. GABRIEL
BY Francis A. Varallo
AGENT 3,210,559

SHIFT REGISTER WITH INTERSTAGE MONOSTABLE PULSE-FORMING AND GATING MEANS

Claude D. Gabriel, King of Prussia, Pa., assignor to Burroughs Corporation, Detroit, Mich., a corporation of Michigan Filed Nov. 6, 1959, Ser. No. 851,325
16 Claims. (Cl. 307—88.5)

This invention relates generally to pulse transfer circuits and more particularly to the transfer of binary pulses within shift registers.

Shift registers are well-known in the computer art. It is frequently desirable in data processing systems to transfer stored information from one stage to another. Shift registers are widely employed to store and manipulate binary information. The application of a control signal, such as a shift pulse, to such a register causes the information stored in each stage to be shifted or transferred to another stage in the same register.

The present invention is a shift register comprising a unique combination of solid state elements and circuits. The transfer of information from one storoge stage to another by the present circuit is accomplished with reliability, economy and simplicity of circuit design.

In general, when information is transferred from one storage stage to another in a register, care must be taken to prevent the transfer of information into a given stage concurrently with the transfer of information out of the same stage. In accordance with the instant invention, binary information stored in the transferor stage is read out by a control or shift pulse applied thereto. The output signal om the transferor stage is converted to a voltage pulse having a duration somewhat longer than the shift pulse. This voltage pulse, which is representative of the binary information stored in the transferor stage, tends to read into a transferee stage the same binary information stored in the transferor stage prior to the occurence of the shift pulse. However, the presence of the shift pulse inhibits the output pulse of the transferor stage from storing information in the transferee stage. It should be remembered that the same shift pulse also reads information out of the transferee stage. At the termination of the shift pulse, when the information stored in both the transferor and transferee stages has been read out, the output voltage pulse which is still present, is applied to the transferee stage and in response thereto this latter stage stores the same binary information stored previously by the transferor stage. The aforementioned technique of converting the stored information to a voltage pulse of predetermined duration and allowing the shift or read-out pulse to inhibit the transfer thereof for a specified time, results in highly reliable operation. The relative durations of the information pulse and the shift pulse can be controlled conveniently by design procedures which allow substantial margins of operating safety.

Accordingly it is a general object of the present invention to provide a novel transfer circuit between two storage stages so as to form a highly efficient building block for use in logical circuit design.

Another object of the invention is to provide a reliable shift register utilizing exclusively solid state electronic components.

A further object of the present invention is to provide a shift register characterized by ease of circuit design which provides wide operating margins of safety and corresponding noncritical circuit performance.

A still further object of the present invention is to provide a shift register in which the danger of reading new information into a given storage stage concurrently with the reading-out of information from said stage, has been eliminated in a positive manner .

A more specific object of the present invention is to provide a shift register in which information is read out from a storage stage in response to a shift pulse applied thereto, is converted to a voltage pulse having a duration longer than that of said shift pulse, and is inhibited from being transferred to another storage stage for the duration of the shift pulse.

These and other features of the invention will hereinafter become more fully apparent from the following description of the annexed drawings, which illustrate a basic embodiment, and wherein:

FIG. 2 is a logical schematic of the circuit depicted in FIG. 1;

FIG. 3 is a chart depicting the binary state of each of the several storage stages for each cycle of operation of the register;

FIG. 4 is a timing diagram depicting the wave forms appearing at various points in the circuit of FIG. 1.

Figure 1:
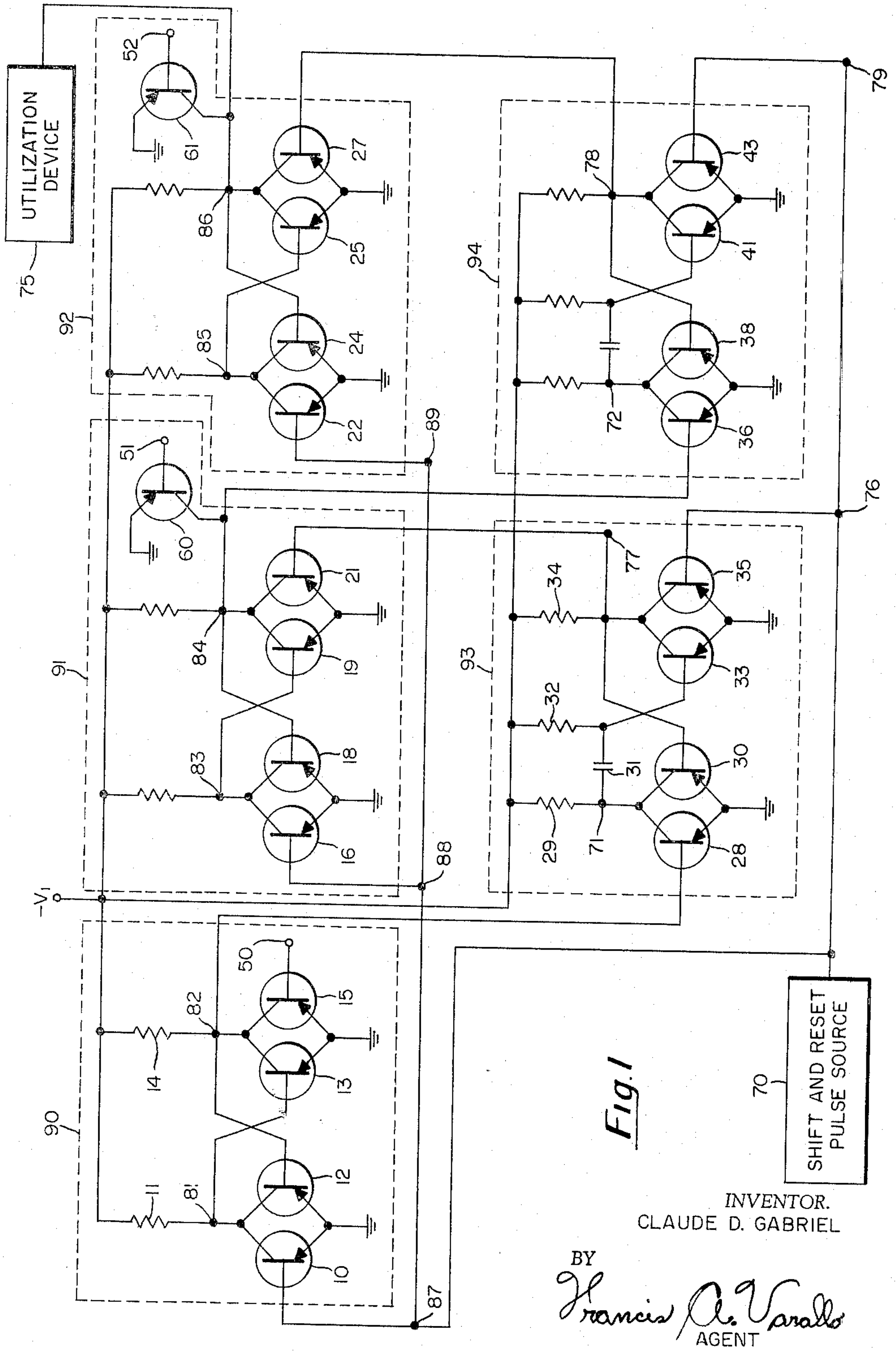
FIG. 1 is a circuit diagram of the shift register of the present invention.

Before proceeding with a detailed description of the circuit of FIG. 1, it should be noted that conventional graphical symbols have been employed to designate the emitter, collector and base electrodes of each of the transistors. Moreover, the invention is not to be considered restricted to the use of the type of transistor depicted in the drawings, but may employ other types in accordance with established design procedures well-known to those skilled in the art.

Referring to FIG. 1, three stages of a shift register, each capable of storing a bit of binary information, are illustrated. Each of the storage stages designated, respectively 90, 91 and 92, consists of a pair of transistors arranged in a cross-coupled flip-flop circuit configuration. Flip-flop 90 comprises transistors 12 and 13; flip-flop 91, transistors 18 and 19; and flip-flop 92, transistors 24 and 25.

Connected in parallel with each of the flip-flop transistors are one or more transistors. The function of these latter transistors is either to set each of the flip-flop storage stages to one of its stable states or to reset the flip-flop to the other of its stable states. For example, flip-flop 90 is provided with a reset transistor 10 connected in parallel with transistor 12 and a set transistor 15 connected in parallel with transistor 13. The emitter electrodes of transistors 10 and 12, and those of transistors 13 and 15 are connected in common to ground. The collectors of transistors 10 and 12 are connected in common by way of resistor 11 to a source of negative potential $-V_1$. Likewise, the collectors of transistors 13 and 15 are connected to source $-V_1$ through resistor 14. Flip-flop 91 has associated with it reset transistor 16 and a pair of set transistors 21 and 60. Flip-flop 92 has associated with it reset transistor 22 and a pair of set transistors 27 and 61. The specific function of each of the set and reset transistors will become apparent in the ensuing description of the circuit operation.

Each of the flip-flop storage stages is coupled to the succeeding stage by a combined monostable multivibrator-inhibit gate circuit. Thus flip-flop 90 is coupled to flip-flop 91 by a monostable multivibrator comprising transistors 28, 30 and 33, and an inhibit gate which utilizes the multivibrator transistor 33 in combination with an additional transistor 35 connected in parallel therewith. This combined multivibrator-gate circuit has been designated by the reference numeral 93. Likewise, monostable multivibrator-gate circuit 94 which comprises transistors 36, 38 and 41 and 43, couples flip-flop 91 to flip-flop 92.

Before considering the over-all operation of the shift register circuit depicted in FIG. 1, it will be helpful to explain the operation of the basic components thereof, namely, the flip-flop, such as 91, and the monostable multivibrator-inhibit gate, as represented by 93. The operation of flip-flops 90 and 92 will be substantially the same as that of flip-flop 91 and that of multivibrator-gate 94, the same as multivibrator-gate 93.

It will be assumed initially that transistor 18 is OFF, or not conducting. Accordingly, terminal 83 which is common to the collector of transistor 18 and the base of transistor 19 is at a negative potential—the actual amplitude of this negative potential being a function of the amplitude of the negative source $-V_1$ and the base current of transistor 19. In the absence of a shift or reset pulse from source 70, the potential appearing at terminal 88 is such that transistor 16 is biased to non-conduction. Moreover, it will be assumed that the potential at terminal 77, connected to the base of transistor 21 is sufficiently positive to keep transistor 21 OFF. The negative potential existing at terminal 83 is applied to the base of transistor 19 and biases the latter transistor to conduction. Under these conditions terminal 84, which is connected to the collector of transistor 19, is substantially at ground potential. Thus transistors 16, 18 and 21 are OFF and transistor 19 is ON. The state of flip-flop 91 wherein transistor 19 is conducting and the potential of terminal 84 is essentially at ground level, has been chosen to represent the binary "1" or "set" state of the flip-flop and such convention is used throughout the following description.

When a negative polarity pulse is applied to terminal 88, which is connected to the base of transistor 16, the latter transistor is driven to conduction. The potential at terminal 83, which is connected to the collectors of transistors 16 and 18, rises from a negative potential to approximately ground. Since terminal 83 is also connected to the base of transistor 19, this rise in potential appears on the base of transistor 19 and turns the latter transistor OFF. Terminal 84, which is connected to the collectors of transistors 19 and 21, goes negative. This negative potential is applied to the base of transistor 18 and turns the latter transistor ON. Thus the potential at terminal 83 remains at approximately ground level regardless of the subsequent termination of the pulse applied to terminal 88. The state of flip-flop 91 in which transistor 19 is OFF and the potential of terminal 84 is negative, has been designated as the "reset" state and is representative of the binary "0." Similarly the flip-flops 90 and 92 respectively are said to be in the "set" state when terminals 82 and 86 are at substantially ground potential; and in the "reset" or "0" state when terminals 82 and 86 are at a negative potential.

The operation of the multivibrator-gate circuit 93 is as follows. It should be observed that the base of transistor 28 is connected to terminal 82 of flip-flop 90. It will be assumed that flip-flop 90 is in the "set" state, and that therefore terminal 82 and the base of transistor 28 are essentially at ground potential. Accordingly, transistor 28 is not conducting. It is further assumed that the multivibrator is in a quiescent state as contrasted with its active, or pulse-forming, state. The base of transistor 33 is connected to the $-V_1$ supply via resistor 32 and is therefore biased to conduction. Capacitor 31 has been charged to substantially the $-V_1$ potential by current flowing from ground into the emitter of transistor 33 and out of the base of transistor 33 through capacitor 31 and resistor 29 to the $-V_1$ supply. The collectors of transistors 33 and 35 are connected in common by way of resistor 34 to the $-V_1$ supply. Because of the conduction of transistor 33, the potential on the collectors of 33 and 35, and hence at terminal 77, is substantially at ground level. This potential also appears on the base of transistor 30 and biases the latter transistor to non-conduction. As hereinbefore mentioned in the absence of a shift or reset pulse from source 70, the potential at terminal 76 (and also at terminals 79, 87, 88 and 89), is substantially at ground level, with the result that transistor 35 is biased OFF.

The active, or pulse-forming, state of the multivibrator-gate 93 is initiated by the application of a negative-going pulse to the base of transistor 28. Such a trigger pulse may be supplied by flip-flop 90 at terminal 82 during the course of the shift register operation. This operation will be considered subsequently in detail. For the present description, it will be assumed that a negative pulse is applied to the base of transistor 28 and as a result transistor 28 is turned ON and is saturated. The collector of transistor 28 rises from substantially the potential of the $-V_1$ source to approximately ground level. This positive-going pulse is reflected by capacitor 31 to the base of transistor 33 and turns the latter transistor OFF. Capacitor 31 then begins to discharge via resistor 32 to the potential of the $-V_1$ supply. The collector voltage of transistor 33, and likewise the potential on terminal 77, goes negative. This negative-going voltage is applied to the base of transistor 30 and turns it ON—thereby insuring that the potential at terminal 71 will remain at ground level throughout the pulse-forming period regardless of the change in potential on the base of transistor 28 subsequent to the initial trigger pulse which initiated the pulse-forming period.

It should be noted that the potential existing on the common collectors of transistors 33 and 35, and at terminal 77, is also applied to the base of transistor 21. As hereinbefore described, during the quiescent period, transistor 33 is ON and transistor 35 is OFF. The potential at terminal 77 is at ground level due to the conduction of transistor 33. Assuming that when a shift pulse from source 70 is applied to terminal 87 of flip-flop 90, the condition of the latter flip-flop is such that transistor 28 is turned ON by the change in potential at terminal 82 of flip-flop 90, the potential at terminal 77 of multivibrator-gate 93 will attempt to go negative. However the same shift pulse applied to terminal 87 of flip-flop 90 is applied concurrently to terminal 76 of gate transistor 35. The shift pulse turns transistor 35 ON thereby causing the collector of transistor 35 and likewise terminal 77 to remain at ground level regardless of the turning OFF of transistor 33 in response to the conduction of transistor 28. At the termination of the shift pulse, the potential existing at terminal 77 will be a function of the conducting or nonconducting state of transistor 33, which potential is applied to the base of transistor 21. The length of time, subsequent to the turning ON of transistor 28, required for capacitor 31 to discharge through resistor 32 to a potential which would allow transistor 33 to resume conduction, must be longer than the duration of the shift pulse.

The operation of the shift register depicted schematically in FIG. 1, and logically in FIG. 2, will be described in detail by illustrating how the bits of a binary word preset in the register are shifted from one stage to another and read out to a utilization device 75. Like reference numerals have been employed in FIGS. 1 and 2 to identify like elements and connections. The following supplementary designations have been used in FIG. 2 to facilitate an understanding of the circuit logic illustrated therein: "FF" referes to flip-flop; "R" and "S" are respectively designations for "reset" and "set"; monostable multivibrator has been abbreviated "MMV." It should also be noted that the "OR" circuit of FIG. 2 refers to the parallel combination of the pair of set transistors associated with flip-flops 91 and 92. For example in flip-flop 91, the "OR" circuit of FIG. 2 comprises transistors 21 and 60 which have input terminals 77 and 51 respectively. Initially the flip-flops 90, 91 and 92 are all cleared to the "reset" or "0" state by the application of a negative-going reset pulse from source 70 to terminals 87, 88 and 89, which are connected respectively to the base electrodes of transistor 10, 16 and 22. The state of each of the storage stages for the various cycles of shift register operation is illustrated in FIG. 3. Information may be read into the shift register either serially or in parallel, by a variety of methods well-known in the art. One of such methods is employed in the circuit embodiment illustrated in FIGS. 1 and 2. Assume that the binary word to be stored in the register is "1–1–0." The most significant bit of information will be stored in flip-flop 90; the least significant bit, in flip-flop 92. In order to store a binary "1" in flip-flop 90, a negative-going pulse is applied to terminal 50 of transistor 15 from a source which has not been shown. It should be recalled that when flip-flop 90 is in the "0" state, transistor 12 is ON and transistor 13 is OFF. The application of a negative pulse to the base of transistor 15 turns the latter transistor ON. Terminal 82, which is connected in common to the collectors of transistors 15 and 13 approaches ground potential, and since the base of transistor 12 is connected to terminal 82, the latter transistor is turned OFF.

An additional transistor 60 is utilized to set flip-flop 91 to the "1" state. A negative-going pulse is applied to terminal 51 of transistor 60, from a source which is not illustrated, and the conduction of the latter transistor causes terminal 84 to approach ground potential. This results in the turning OFF of transistor 18, which in turn causes terminal 83 to go negative. This negative potential is applied to the base of transistor 19 and turns the latter transistor ON. Flip-flop 91 is now in the "1" state.

Since flip-flop 92 has been cleared to the "0" state and since a "0" is to be stored in flip-flop 92, no further action thereon is required. If desired a "1" may be stored in flip-flop 92 in a similar manner to that described in connection with flip-flop 91, that is, by applying a negative-going pulse to terminal 52 of set transistor 61.

Prior to the receipt of a shift pulse in the first transfer cycle terminals 82 and 84 of flip-flops 90 and 91 respectively are substantially at ground potential, and terminal 86 of flip-flop 92 is at a negative potential. Multivibrator-gate 93 is in a quiescent state with transistor 33 ON and transistors 28, 30 and 35 OFF. Likewise multivibrator 94 is also in a quiescent state with transistor 41 ON and transistors 36, 38 and 43 OFF. The shift pulse occurring in the first transfer cycle following the presetting of the binary word in the register is applied concurrently to terminals 87, 88, 89 and 76, 79. In response to this shift pulse, flip-flops 90 and 91 are driven from the "1" state to the "0" state, and the potential existing on terminals 82 and 84 respectively thereof fall from ground level to a negative potential. Since flip-flop 92 is already in the "0" state and the shift pulse tends to drive all the flip-flops to the "0" state, there is no change in potential at terminal 86 of flip-flop 92. This latter condition is representative of the readout of a binary "0" and as such is sensed by the utilization device 75.

It is expected that the shift pulse in the first transfer cycle will transfer the "0" stored in flip-flop 92 to the utilization device 75, the "1" stored in flip-flop 91 to flip-flop 92, and the "1" stored in flip-flop 90 to flip-flop 91. The manner of transferring the "0" from flip-flop 92 to utilization device 75 is evident from the foregoing description. With respect to the transfer of the binary "1" from flip-flop 91 to the flip-flop 92, the negative-going potential on terminal 84, which is representative of the change of state of flip-flop 91 from the "1" to the "0" state, is applied to the base of transistor 36 of multivibrator-gate 94 and initiates a pulse-forming period. Terminal 78 of multivibrator gate 94, in the absence of a shift pulse at terminal 79 would be drive from ground potential to a negative potential by the turning OFF of transistor 41. This negative-going potential at terminal 78, if applied to the base of set transistor 27 of flip-flop 92, would tend to drive the latter flip-flop to the "1" state at the same time that the shift pulse at terminal 89 was attempting to reset flip-flop 92 to the "0" state. However as previously explained, this condition is prevented by the conduction of transistor 43 in response to the shift pulse applied to terminal 79 connected to its base electrode. The conduction of transistor 43 keeps terminal 78 at substantially ground potential as long as the shift pulse is present. At the termination of the shift pulse the monostable multivibrator of circuit 94 is still in the active, or pulse-forming, state and transistor 41 is OFF. Transistor 43 is also OFF at this time. Terminal 78 falls from ground level to a negative potential, and transistor 27 of flip-flop 92 is driven to conduction. Terminal 86 of flip-flop 92 rises to approximately ground level, thereby turning transistor 24 OFF and causing terminal 85 to go negative. This latter potential biases transistor 25 to conduction and flip-flop 92 is set to the "1" state.

FIG. 4 illustrates the relative times of occurrence and duration of the shift pulse, the monostable multivibrator pulse-forming period, and the inhibit gate output pulse. The last pulse is representative of the transfer of a binary "1" from one storage stage to another as, for example, the pulse appearing on terminal 78 in the foregoing description of the transfer of a "1" from flip-flop 91 to flip-flop 92.

The transfer of the binary "1" in flip-flop 90 to flip-flop 91 is accomplished in much the same manner. The negative pulse produced by the change in potential at terminal 82 of flip-flop 90 by the shift pulse in the first transfer cycle, initiates the conduction of transistor 28 of multivibrator-gate 93 and hence the pulse-forming period thereof. Here again the potential at terminal 77 remains unchanged due to the conduction of transistor 35 in response to the shift pulse applied to terminal 76. At the termination of the shift pulse, terminal 77 goes negative and flip-flop 91 is driven to the "1" state by the action of set transistor 21.

Thus at the end of the first transfer cycle flip-flops 91 and 92 are in the "1" state and flip-flop 90 is in the "0" state. The states of all the storage stages at the end of this cycle and the succeeding cycles are listed in the chart of FIG. 3.

The application of a shift pulse to the register in a second transfer cycle causes the potential of terminal 86 of flip-flop 92 to drop from approximately ground level to a negative potential. This condition, representative of the readout of a binary "1" from a storage stage of the register is sensed by the utilization device 75. There are a variety of circuits well-known in the art which may be employed to sense the occurrence of the negative-going potential on terminal 86. For example, if desired, the utilization device 75 may include a monostable multivibrator of the type described herein, to produce an output pulse of any predetermined duration in response to said change in potential applied to its input terminal. Such an output pulse would be representative of the binary "1." The absence of an output pulse from the monostable multivibrator would be indicative of the readout of a binary "0."

The transfer of the binary "1" from flip-flop 91 to flip-flop 92 is accomplished in the manner hereinbefore described in connection with the first transfer cycle. Since flip-flop 90 is in the "0" state at the end of the first transfer cycle, it is expected that flip-flop 91 will be in the "0" state at the end of the second transfer cycle. In effect, the "0" stored in flip-flop 90 will have been transferred to flip-flop 91. At the end of the first transfer cycle terminal 82 of flip-flop 90 is at a negative potential capable of biasing transistor 28 of the monostable multivibrator of circuit 93 to conduction. Likewise transistor 33 is ON and terminal 77 is substantially at ground level, thereby biasing OFF transistor 21 of flip-flop 91. The application of a shift pulse to terminal 87 tends to drive flip-flop 90 to the "0" state and since flip-flop 90 is already in the "0" state, there is no change in potential at terminal 82. Thus monostable multivibrator 93 is unaffected by the occurrence of the shift pulse in the second transfer cycle, and set transistor 21 of flip-flop 91 remains OFF. Moreover, since the same shift pulse has driven flip-flop 91 from the "1" state to the "0" state, flip-flop 91 is in the "0" state at the termination of the second transfer cycle. Thus at the end of the second cycle, flip-flop 92 is in the "1" state and flip-flops 90 and 91 are each in the "0" state.

The shift pulse occurring in the third transfer cycle reads the "1" out of flip-flop 92 and into the utilization device 75 as described in connection with the second transfer cycle, and the register is completely clear at the end of the third transfer cycle.

From the foregoing consideration of the shift register operation it is readily apparent that the configuration of solid state electronic elements suggested by the instant invention results in the reliable transfer of binary information from one storage stage to another. This reliability is achieved with efficiency and simplicity of circuit design.

Since other modifications varied to fit particular operating requirements will be apparent to those skilled in the art, the invention is not considered limited to the embodiment chosen for purposes of disclosure, and covers all changes and modifications which do not constitute departures from the true spirit and scope of this invention. Accordingly, all such variations as are in accord with the principles discussed previously are meant to fall within the scope of the appended claims.

What is claimed is:

1. In a shift register, a transferor storage stage and a transferee storage stage, each of said stages being capable of assuming one or the other stable states, means for applying reset pulses to each of said stages, a transfer circuit interposed between said storage stages and comprising a monostable multivibrator and a gate circuit, said monostable multivibrator having an input and an output terminal, circuit means coupling said input terminal of said monostable multivibrator to said transferor stage, said gate circuit having a pair of input terminals and an output terminal, means coupling the output terminal of said monostable multivibrator to one of said input terminals of said gate circuit, the other of said input terminals of said gate circuit being adapted to be pulsed from a source of inhibit pulses, the output terminal of said gate circuit being coupled to said transferee storage stage.

2. A transfer circuit for a shift register comprising a pair of storage devices, means for applying reset pulses to said devices, a monostable multivibrator and a gate circuit interposed between said storage devices, said monostable multivibrator responding to the resetting of a first of said storage devices by assuming its pulse-forming state, means for applying the output pulse formed by said monostable multivibrator to said gate circuit, means for inihibiting the passage of said output pulse through said gate circuit during the period when one of said reset pulses is present, and means including said gate circuit responsive to the termination of said reset pulse for applying said monostable multivibrator output pulse to the second of said storage devices so as to tend to switch said second storage device to a predetermined storage state.

3. In a shift register, two binary storage devices containing stored information, means for applying a shift pulse to both of said devices so as to simultaneously clear said devices of their stored information, a monostable multivibrator and a gate circuit, said monostable multivibrator being normally in a quiescent state but being capable of assuming a pulse-forming state, circuit means connecting said monostable multivibrator to a first of said storage devices, said monostable multivibrator being switched from the quiescent state to the pulse-forming state in response to the clearing of said first storage device by said shift pulse, a gate circuit interposed between said monostable multivibrator and the second of said storage devices, means for applying the pulse formed by said monostable multivibrator to said gate circuit, said monostable multivibrator pulse appearing as the output of said gate circuit and tending to switch said second storage device to a predetermined stable state, means for applying an inhibit pulse to said gate circuit to prevent the transfer of said monostable multivibrator pulse to said second storage device during the time when said shift pulse is present and said second storage device is being cleared, and means for employing said monostable multivibrator pulse to switch said second storage device to a predetermined stable state when said inhibit pulse has been removed.

4. A shift register as defined in claim 3 characterized in that said shift pulse and said inhibit pulse are one and the same pulse derived from a unitary source and applied simultaneously to said binary storage devices and said gate circuit.

5. In a shift register, a transferor stage and a transferee storage stage, each of said storage stages being capable of assuming either a "reset" or a "set" stable state, each of said stages being adapted to be pulsed from a source of shift pulses, a monostable multivibrator and a gate circuit interposed between said storage stages, said monostable multivibrator being normally in a quiescent state but being capable of being switched to a pulse-forming state, the switching of said transferor storage stage from the "set" state to the "reset" state switching said monostable multivibrator from the quiescent state to the pulse-forming state, said gate circuit having a pair of input terminals and an output terminal, the output terminal of said gate circuit being coupled to said transferee storage stage, means for applying the pulse formed by said monostable multivibrator to one of the input terminals of said gate circuit, means for applying said shift pulse to the other input terminal of said gate circuit, said latter pulse inhibiting the monostable multivibrator output pulse from appearing on the output terminal of said gate circuit, said monostable multivibrator output pulse being of longer duration than said shift pulse and being operative upon the termination of said shift pulse to switch said transferee storage stage from the "reset" state to the "set" state.

6. In a shift register, first and second bistable devices, each of said bistable devices being capable of assuming either a "set" or a "reset" state representative respectively of the binary "1" and "0" states, means for applying reset pulses to each of said bistable devices, each of said bistable devices comprising a first and a second cross-coupled current amplifying element, reset means associated with each of said first amplifying elements, set means associated with each of said second amplifying elements, a monostable pulse-forming circuit having an input trigger terminal and an output terminal, circuit means coupling the input terminal of said monostable pulse-forming circuit to said second amplifying element of said first bistable device, an inhibit gate having a pair of input terminals and an output terminal, said output terminal of said gate being coupled to said set means associated with the second amplifying element of said second bistable device, means connecting the output terminal of said monostable pulse-forming circuit to one of the input terminals of said gate, and means for applying inhibit pulses to the other input terminal of said inhibit gate.

7. In a shift register, a first and a second bistable storage stage, each of said stages comprising a first and a second cross-coupled junction transistor, means for applying reset pulses to each of said stages, a reset transistor connected in parallel with each of said first transistors, at least one set transistor connected in parallel with each of said second transistors, each of said transistors having an emitter, a collector and a base electrode, a monostable multivibrator, said monostable multivibrator having an input terminal and an output terminal, means connecting the input terminal of said monostable multivibrator to the collector electrode of said second transistor of said first storage stage, a gate circuit, said gate circuit having a pair of input terminals and an output terminal, said output terminal of said gate circuit being connected to the base electrode of one of said set transistors connected in parallel with the second transistor of said second storage stage, means connecting the output terminal of said monostable multivibrator to one of the input terminals of said gate circuit, and means connecting a source of inhibit pulses to the other terminal of said gate circuit.

8. In a shift register, first and second flip-flop devices containing stored information, means for applying a shift pulse to both of said devices so as to simultaneously clear the devices of their stored information, each of said flip-flop devices comprising first and second transistors, a monostable multivibrator comprising third, fourth and fifth transistors and a capacitive element, each of said transistors having an emitter, a collector and a base electrode, each of said flip-flop devices including means connecting the collector electrode of one transistor to the base electrode of the other transistor, the emitter electrode of all of said transistors being connected in common to a source of reference potential, the collector electrodes of said third and fourth transistors respectively being connected in common and being coupled by said capacitive element to the base electrode of said fifth transistor, the collector electrode of said fifth transistor being connected to the base electrode of said fourth transistor, the base electrode of said third transistor being connected to the collector electrode of said second transistor of said first flip-flop device, said monostable multivibrator being normally in a quiescent state but being capable of assuming a pulse-forming state, the change in voltage on the collector electrode of said second transistor of said first flip-flop device in response to the clearing of said latter device by said shift pulse resulting in the switching of said monostable multivibrator from the quiescent state to the pulse-forming state, a gate circuit interposed between said monostable multivibrator and the second of said flip-flop devices and having a pair of input terminals and an output terminal, the output pulse formed by said monostable multivibrator during said pulse-forming period appearing on the collector electrode of said fifth transistor, the collector electrode of said fifth transistor being connected to one of the input terminals of said gate circuit, the output terminal of said gate circuit being coupled to said second flip-flop device whereby the monostable multivibrator output pulse appearing thereon tends to switch said second flip-flop device to a predetermined stable state, means for applying one of said shift pulses to the other input terminal of said gate circuit, said shift pulse inhibiting the transfer of said monostable multivibrator output pulse to said second storage device during the time when said second storage device is being cleared, said monostable multivibrator output pulse being of longer duration than said shift pulse and being operative upon the termination of said shift pulse to switch said second flip-flop device to a predetermined stable state.

9. A shift register as defined in claim 8 characterized in that said transistors are all of the junction variety and are of the same conductivity type.

10. A shift register as defined in claim 8 further characterized in that connected in parallel with each of the transistors of said flip-flop device is at least one additional transistor whose collector electrode is connected to the collector electrode of the said flip-flop transistor, and whose emitter is connected to the emitter of the said flip-flop transistor, said additional transistor functioning as a set or a reset device.

11. A shift register as defined in claim 10 characterized in that said gate circuit includes an additional gating transistor connected in parallel with said fifth transistor of said monostable multivibrator, said gating transistor having an emitter, a collector and a base electrode, the collector electrode of said fifth transistor being connected to the collector electrode of said gating transistor, the emitter electrodes of said fifth transistor and said gating transistor respectively being connected to said reference potential, the collector electrodes of said fifth transistor and said gating transistor being coupled both to a source of bias potential and to the base electrode of the set transistor associated with said second transistor of said second flip-flop device, each of said shift pulses being applied to the base electrode of said gating transistor, the amplitude of the voltage appearing on the common collector electrodes of said fifth transistor and said gating transistor during the pulse-forming period of said monostable multivibrator being a function of the presence or absence of one of said shift pulses.

12. In a shift register, a transferor storage stage and a transferee storage stage, each of said stages being capable of assuming one or the other stable states, means for applying reset pulses to each of said stages, a transfer circuit interposed between said storage stages and comprising monostable pulse-forming means and a gate circuit, said monostable means having an input and an output terminal, circuit means coupling said input terminal of said monostable means to said transferor stage, said gate circuit having a pair of input terminals and an output terminal, means coupling the output terminal of said monostable means to one of said input terminals of said gate circuit, the other of said input terminals of said gate circuit being adapted to be pulsed from a source of inhibit pulses, the output terminal of said gate circuit being coupled to said transferee storage stage.

13. A transfer circuit for a shift register comprising a pair of storage devices, means for applying reset pulses to said devices, monostable pulse forming means and a gate circuit interposed between said storage devices, said monostable means responding to the reset of a first of said storage devices by assuming its pulse-forming state, means for applying the output pulse formed by said monostable means to said gate circuit, means for inhibiting the passage of said output pulse through said gate circuit during the period when one of said reset pulses is present, and means including said gate circuit responsive to the termination of said reset pulse for applying said monostable means output pulse to the second of said storage devices so as to tend to switch said second storage device to a predetermined storage state.

14. In a shift register, first and second flip-flop devices, means for applying reset pulses to each of said flip-flop devices, a monostable multivibrator, a gate circuit, each of said flip-flop devices comprising first and second transistors, said monostable multivibrator comprising third, fourth and fifth transistors and a capacitive element, each of said transistors having an emitter, a collector and a base electrode, each of said flip-flop devices including means connecting the collector electrode of one transistor to the base electrode of the other transistor, the emitter electrodes of all of said transistors being connected in common to a source of reference potential, the collector electrodes of said third and fourth transistors being connected in common and being coupled by said capacitive element to the base electrode of said fifth transistor, the base electrode of said third transistor of said monostable multivibrator being connected to the collector electrode of said second transistor of said first flip-flop device, said gate circuit having a pair of input terminals and an output terminal, the collector electrode of said fifth transistor of said monostable multivibrator being connected in common to the base electrode of said fourth transistor and to one of the input terminals of said gate circuit, means for applying inhibit pulses to the other input terminal of said gate circuit, and means including said output terminal of said gate circuit for coupling said gate circuit to said second flip-flop device, said gate circuit including an additional gating transistor connected in parallel with said fifth transistor of said monostable multivibrator, said gating transistor having an emitter, a collector and a base electrode, the collector electrode of said fifth transistor being connected to the collector electrode of said gating transistor, the emitter electrodes of said fifth transistor and said gating transistor respectively being connected to said reference potential, the collector electrodes of said fifth transistor and said gating transistor being coupled both to a source of bias potential and to the base electrode of the set transistor associated with said second transistor of said second flip-flop device, said inhibit pulses being applied to the base electrode of said gating transistor, the amplitude of the voltage appearing on the common collector electrodes of said fifth transistor and said gating transistor during the pulse-forming period of said monostable multivibrator being a function of the presence or absence of one of said inhibit pulses.

15. A shift register as defined in claim 14 characterized in that said transistors are all of the junction variety and are of the same conductivity type.

16. A shift register as defined in claim 14 further characterized in that connected in parallel with each of the transistors of said flip-flop device is at least one additional transistor whose collector electrode is connected to the collector electrode of the said flip-flop transistor, and whose emitter is connected to the emitter of the said flip-flop transistor, said additional transistor functioning as a set or a reset device.

References Cited by the Examiner

UNITED STATES PATENTS

| | | | |
|---|---|---|---|
| 2,794,123 | 5/57 | Younker | 328—55 |
| 2,907,898 | 10/59 | Clark | 307—88.5 |
| 2,933,622 | 4/60 | Clark | 307—88.5 |
| 2,956,181 | 10/60 | Norman | 307—88.5 |
| 3,105,157 | 9/63 | Norman | 307—88.5 |
| 3,119,983 | 1/64 | Carroll et al. | 307—88.5 |

FOREIGN PATENTS

| | | |
|---|---|---|
| 858,969 | 1/61 | Great Britain. |

JOHN W. HUCKERT, *Primary Examiner.*

HERMAN K. SAALBACH, *Examiner.*